Figure 1:
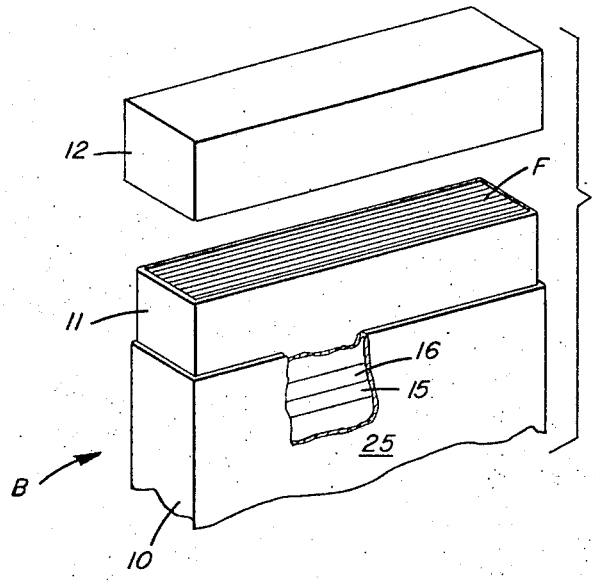
Figure 2:
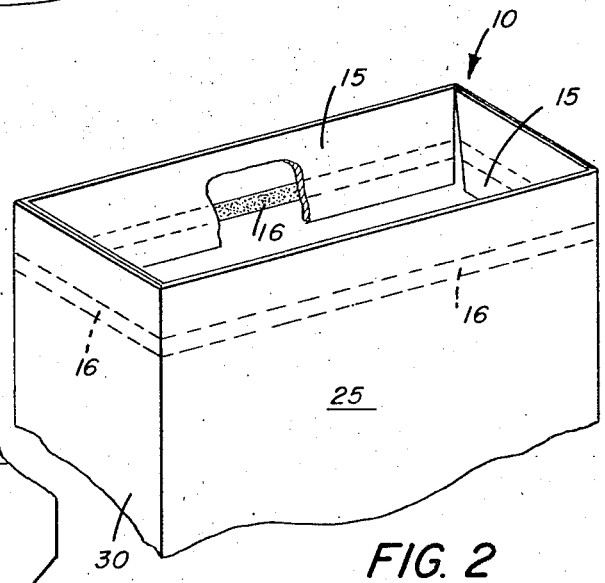
Figure 3:
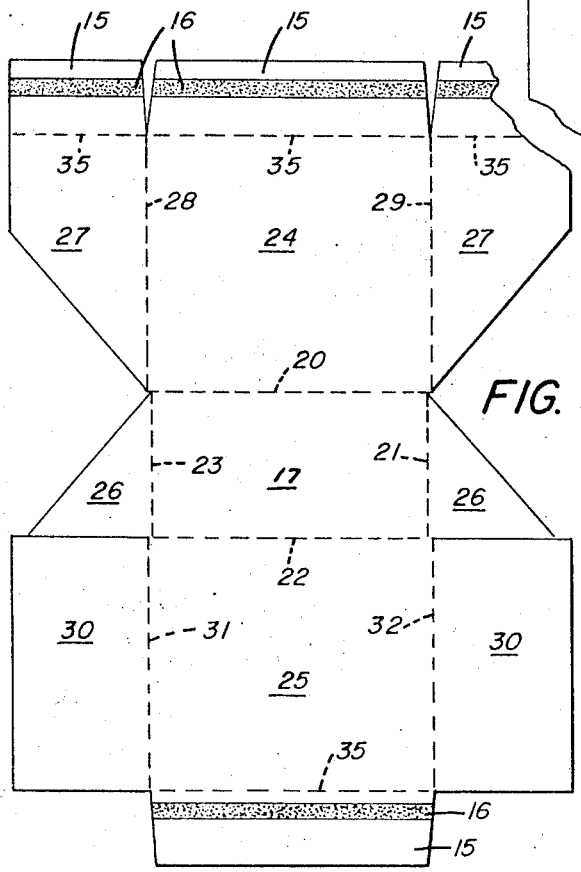

XR T 903,035

Oct. 10, 1972 250/507.1 T903,035

X-RAY FILM BOX HAVING A MONITORING RADIATION SHIELD

Filed Sept. 27, 1971

CHESTER W. OPPERMAN
INVENTOR.

BY

Earl T. Thoreson

ATTORNEY

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 375

T903,035
X-RAY FILM BOX HAVING A MONITORING RADIATION SHIELD

Chester W. Opperman, 1669 Lake Ave., Rochester, N.Y. 14650

Filed Sept. 27, 1971, Ser. No. 183,933
**Int. Cl. G21f *1/00***
U.S. Cl. 250—108 R
1 Sheet Drawing. 9 Pages Specification

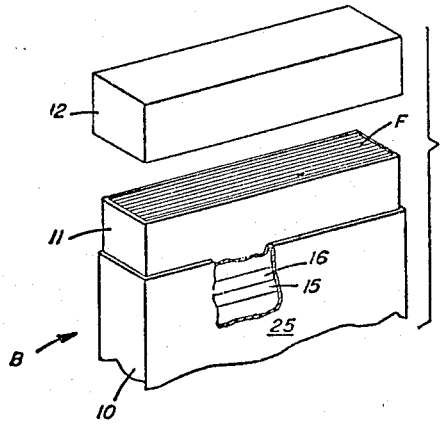

A paperboard box for X-ray film is provided with a radiation monitoring shield which indicates when and if a film contained therein has been accidentally exposed to X-rays or other rays of comparable wave length to X-rays. This radiation monitoring shield consists of a hot melt adhesive having a particulate material impervious to X-rays dispersed and suspended therein. The adhesive mixture is used in assembling the box and can be applied to the box blank by the use of conventional box assembling machinery so that the expense of fabricating this box is not appreciably increased by the addition of this radiation monitoring shield thereto.